US012131600B2

(12) United States Patent
Kolpan Carter

(10) Patent No.: US 12,131,600 B2
(45) Date of Patent: Oct. 29, 2024

(54) SECURITY SYSTEM FOR NORMALLY-OPEN FACILITY ACCESS BY KNOWN POPULATIONS

(71) Applicant: Leslie Mark Kolpan Carter, Boca Raton, FL (US)

(72) Inventor: Leslie Mark Kolpan Carter, Boca Raton, FL (US)

( * ) Notice: Subject to any disclaimer, the term of this patent is extended or adjusted under 35 U.S.C. 154(b) by 70 days.

(21) Appl. No.: 17/938,864

(22) Filed: Oct. 7, 2022

(65) Prior Publication Data

US 2024/0119771 A1 Apr. 11, 2024

(51) Int. Cl.
*G07C 9/00* (2020.01)

(52) U.S. Cl.
CPC ................................ *G07C 9/00563* (2013.01)

(58) Field of Classification Search
CPC ................................................. G07C 9/00563
USPC ........................................................ 340/5.2
See application file for complete search history.

(56) References Cited

U.S. PATENT DOCUMENTS 6,504,470 B2 * 1/2003 Puchek .................... G07C 9/23 340/5.53
6,720,874 B2 * 4/2004 Fufido .................. G08B 13/183 340/556
7,222,239 B2 * 5/2007 Smith ...................... G07C 9/27 713/185
7,623,674 B2 * 11/2009 Nichani .................... G06T 7/20 348/47
8,102,238 B2 * 1/2012 Golander ................. G07C 9/28 340/5.2
9,378,598 B2 * 6/2016 Dumas ..................... G07C 9/28
10,235,822 B2 * 3/2019 Nye ........................ G05B 15/02
10,679,442 B1 * 6/2020 Rogers ............... G07C 9/00571
10,733,861 B2 * 8/2020 Russo ................ G07C 9/00571
11,069,167 B2 * 7/2021 Einberg ............. G07C 9/00571
11,495,071 B2 * 11/2022 Tzirimis .................. G07C 9/27
2004/0153671 A1 * 8/2004 Schuyler .................. G07C 9/28 726/9
2005/0110610 A1 * 5/2005 Bazakos ................ G08G 1/207 340/5.82
2007/0078782 A1 * 4/2007 Ono ................... G06Q 20/3674 705/67
2007/0268145 A1 * 11/2007 Bazakos .................. G07C 9/28 340/521
2010/0307206 A1 * 12/2010 Taylor ................ G07C 9/00309 70/91
2014/0002236 A1 1/2014 Pineau et al.

(Continued)

OTHER PUBLICATIONS

International Search Report and Written Opinion of the International Search Report; Application No. PCT/US 23/76099; Completed: Dec. 19, 2023; Mailing Date: Apr. 24, 2024; 9 Pages.

*Primary Examiner* — Nam V Nguyen
(74) *Attorney, Agent, or Firm* — Whitmyer IP Group LLC

(57) ABSTRACT

The invention provides a security system for non-public, normally-open facilities such as schools. A security perimeter spaced apart from the normally-open door passively scans persons attempting access and actuates facility closure if a security threat is detected. Security threats include: a person without any security token, a person with a security token that does not match their current bio-data, and a person who although they have a security token matching their current bio-data exhibits one or more physiological traits consistent with mental or physical distress.

4 Claims, 1 Drawing Sheet

(56) References Cited

U.S. PATENT DOCUMENTS

| | | | | |
|---|---|---|---|---|
| 2015/0312531 | A1* | 10/2015 | Samad .................. | H04N 7/186 348/143 |
| 2017/0332055 | A1 | 11/2017 | Henderson | |
| 2019/0172281 | A1 | 6/2019 | Einberg et al. | |
| 2020/0267144 | A1* | 8/2020 | Wagner .............. | G06Q 20/1085 |
| 2021/0217532 | A1 | 7/2021 | Heimerl | |
| 2021/0266737 | A1* | 8/2021 | Burke ............... | G06F 16/24553 |
| 2022/0076513 | A1 | 3/2022 | Burge et al. | |
| 2022/0148397 | A1 | 5/2022 | Schoeman | |
| 2023/0206708 | A1 | 6/2023 | Carter | |

* cited by examiner

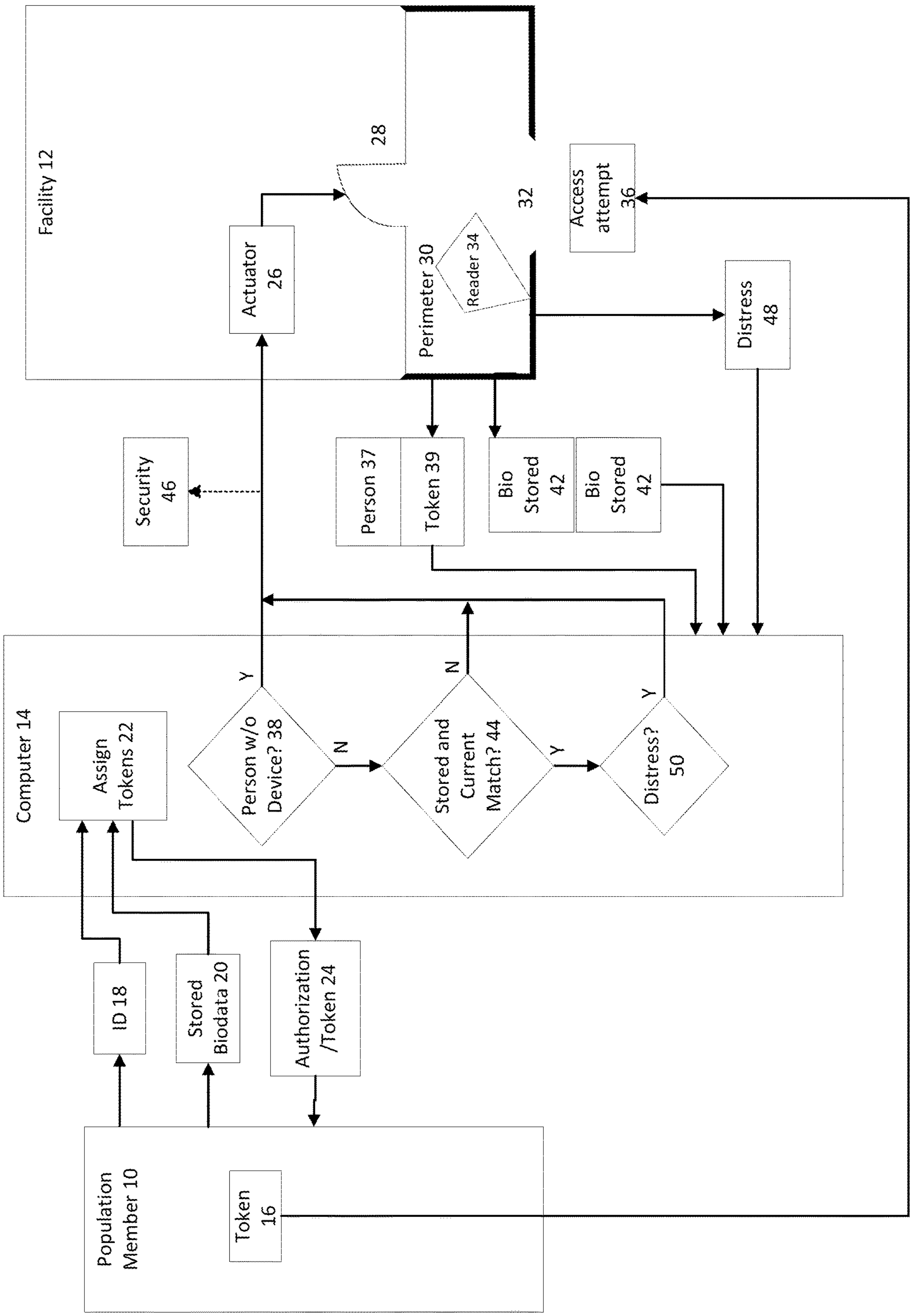
Facility 12
28
32
Access attempt 36
Actuator 26
Perimeter 30
Reader 34
Distress 48
Security 46
Person 37
Token 39
Bio Stored 42
Bio Stored 42
Computer 14
Assign Tokens 22
Person w/o Device? 38
Y
N
Stored and Current Match? 44
N
Y
Distress? 50
Y
ID 18
Stored Biodata 20
Authorization /Token 24
Population Member 10
Token 16

SECURITY SYSTEM FOR NORMALLY-OPEN FACILITY ACCESS BY KNOWN POPULATIONS

TECHNICAL FIELD

The invention relates to security systems for non-public spaces such as schools or workplaces with a known population such as students or employees that require frequent access. The invention also relates to a wearable bio-data device used as a security token.

BACKGROUND

In recent years, large non-public spaces such as schools and workplaces have all too often been the scene of mass shootings. Typically, but not always, the shooter is a member of the population he intends to harm. Several strategies have been employed to combat this social problem and increase facility security.

In some cases armed guards and human intelligence have been deployed in an effort to reduce risk without substantially impacting the daily routine of students and employees. This system aims to reduce risk by identifying potential bad actors with human intelligence and stopping them with deadly force if necessary. While it attempts to be non-invasive on the student/worker population, guards carrying guns makes many people uncomfortable and particularly in the case of students may have a lasting negative impact on their psyche. The fact that shootings have continued over the past years suggests that these security measures have had little or no impact.

Passive security systems are also known. In these systems a security card or token of some type is remotely scanned to provide access to the token to provide access into and track members of the population throughout the facility. While such passive systems are noninvasive, they really only provide facility access to the token not the person. In other words, they can't determine if the token is stolen or borrowed. In addition to not being able to determine the identity of the person carrying the token they also have no way to determine their mental or physical state in order to assess risk of providing access into and throughout the facility.

Another strategy to combat mass shooting risk at non-public spaces is simply to lock them down. In other words, each time a member of the known population attempts to enter they must identify themselves and subject themselves to an invasive search. Identification can be accomplished by known security cards but a higher level of security which protects against security card theft is a bio-data scan of some type. Known bio-data scans include fingerprint and iris scans, DNA sequencing, tooth matching, weighted trained AI, voice detection, biological barcoding, and implanted chips, to name a few. Metal detectors and body scans are examples of the invasive searches that may be used instead of or in addition to bio-data scans.

An obvious problem with locking down facilities is that they become a type of prison. And although the risk of a mass shooting may be reduced, the psychological impact on workers and students can be immense. It's an unfortunate fact that elementary schools have become the scene of mass shootings and locking them down in this manner will almost certainly have a negative impact on student mental health and ultimately on our society as a whole.

What is desired therefore is a system limiting access to facilities such as schools and workplaces which increases student and employee security while minimizing psychological impacts of a locked down facility and/or a deadly-force-carrying security presence.

SUMMARY

Accordingly, it is an object of the invention to provide improved security at normally-open nonpublic facilities such as schools and workplaces.

It is another object of the invention to provide a security system which limits access of nonpublic facilities to a known population.

It is a further object of the invention to provide a security system which is passive and does not require facility lock-down.

It is yet another object of the invention to provide a security system which limits access to a nonpublic facility based on a bio-data token.

It is yet a further object of the invention to provide a security system which alerts facility security if a member of the know accessing population is under physical stress consistent with a mass shooter.

Still another object of the invention is to improve security at schools in a way that limits psychological impact on students.

The invention achieves these and other objects by providing non-public, normally-open facilities such as schools with a security perimeter. The security perimeter passively scans persons attempting access and actuates facility closure if a security threat is detected. Security threats include: a person without any security token, a person with a security token that does not match their current bio-data, and a person who although they have a security token matching their current bio-data exhibits one or more physiological traits consistent with mental or physical distress, as measured by the token or otherwise. Members of the public needing access to the facility such as parents in case the facility is a school, can obtain a temporary token at the security perimeter. Students or employees in case the facility is a workplace or school are issued or matched to a security token. The token may be a phone or watch or button which can: facilitate storage of a bio-data at the time the token is issued by the facility, facilitate measurement of the current value of the same type of bio-data from the wearing person in the population permitted facility access, and transmit the stored and current bio-data (or some indication that they match) to a passive reader at the security perimeter.

Preferably also, the token can sense physiological indicators consistent with a mass shooter such as elevated blood pressure, elevated pulse, some chemical imbalance of an alarming nature, or other indicators such as emotional state or movement patterns. In the invention, a sensed indication of physical or mental distress can be used to either close the facility or can simply be used to alert facility security to make a personal intervention with the population member in distress. In this way students can continue to enjoy an open school without daily invasive security requirements that can have negative psychological impacts while also being safer from the horror of mass shootings.

BRIEF DESCRIPTION OF THE DRAWINGS

FIG. 1 is a schematic diagram illustrating a bio-data token based passive security system for a non-public facility such as a school in accordance with the invention.

DETAILED DESCRIPTION

FIG. 1 depicts a security system of the invention which improves safe access of population members 10 to facility

12. Facility 12 is intended to be a normally-open but non-public facility such as a factory or school where a population, for example of known workers/students access the facility on a regular basis. In facilities of this type the invention provides a passive security system that nonetheless blocks unauthorized persons and in some configurations even blocks authorized persons from access if their bio-data indicates they may be in physical or emotional distress. The invention can be used without facility security, but normally facility security will work in conjunction with the system in order, for example, to allow access to the facility by authorized but occasional visitors and also possibly to prevent or double-check access to authorized persons. Interactions of this kind by facility security personal are not the focus of the invention but are useful in explaining how the invention works in practice.

A security computer 14 is central to the invention. Computer 14 is used in the first instance to authorize or issue security tokens 16 to population members 10, such as students, in case facility 12 is a school. Tokens 16 can be provided in many forms. They might be smart phones, smart watches, fitness devices or any kind of bio-data sensor that may or may not be connected to a smart phone. In another aspect of the invention, the construction of the token 16 and the particular bio-data it senses is discussed below. However, the invention in main is not reliant on any particular token type.

If a population member 10 owns a viable token 16 for use in the security system of the invention, then it is presented to computer 14 which may be controlled by a manager or security officer at facility 12. Token 16 is presented to computer 14 together with some kind of identification 18 and bio-data 20 for population member 10. Computer 14 authorizes at 22 token 16 by matching the identification 18 with a particular bio-data 20. Current bio-data 20 can either be stored on or directly accessible to computer 14 or it can be stored on token 16. Neither option is shown in FIG. 1 but that is because either option is possible within the scope of the invention.

In the event that population member 10 does not own a viable token 16 then the manager or security of facility 12 can issue a token 16 to population members 10 who provide identification 18 and bio-data 20 for association by computer 14. Even if bio-data 20 is stored on token 16 as opposed to computer 14, computer 14 is still used in the issuance or authorization 24 of tokens 16 because there must be some way to check the presented population member 10 and identification 18 are in fact permitted access to facility 12. In other words, tokens 16 should only be authorized or issued if the presenting person is a matriculated student at the school or an employed worker at the business.

Thus far we have discussed setup steps taken by population members 10, but facility 12 also requires some initial set up in order to utilize the security system of the invention. In addition to computer 14, facility 12 needs an actuator 26 in data communication with the security computer in order to close door 28 of the facility in case a security risk is detected.

In addition to actuator 26, the security system of the invention requires establishing a security perimeter 30 which is spaced apart from door 28 and used to funnel all approaching population members 10 toward door 28 for access to facility 12. Note that door 28 is provided according to the invention as a normally-open (that is to say unlocked) door. Providing security while maintaining an unlocked door 28 is one of several objects of the invention because it reduces unwanted psychological impact on students and workers of regularly entering a locked-down facility.

Perimeter 30 can be provided in many forms from fences to plantings to walls. All that is needed is that population members 10 must pass through opening 32 in perimeter 30 in order to reach the normally-open door 28 of facility 12. As population members 10 pass through opening 32, reader 34 senses the access attempt 36 of token 16. Note that if reader 34 senses the approach (not shown) of a person without a token as shown at 38, then computer 14 generates a signal to actuator 26 to close door 28. If instead, reader 34 senses a person with a token 39, then computer leaves door 28 open and proceeds to analyze whether stored bio-data for token 39 matches current, or indeed instantaneous bio-data from the person making access attempt 36.

A word about the bio-data as that term is used in this patent and for this invention. By "bio-data" is meant any physical measurement that can now or in the future be made on a person and analyzed in an attempt to identify that person with a variable degree of certainty. For example, fingerprints are bio-data 20 that can be measured from population members 10 and stored on or in conjunction with tokens 16 to identify persons. For example, while a single fingerprint may not provide a conclusive identification, several fingerprints may suffice for conclusive identification of persons, and prints from all ten fingers would allow—for all practical purposes—a conclusive identification. In like manner, one of ordinary skill in the art of bio-data identification will understand that comparing stored bio-data with currently or indeed instantaneously measured bio-data for purposes of comparison is not a binary process and instead there is a range of sameness which should be used with a concomitant range of certainty about identification from so-called "matching" of bio-data. The quantity and quality of bio-data used in an effort to match and determine identify based on prior bio-data measurements will necessarily vary the security of the system according to the invention as will be understood by one of ordinary skill.

Nonetheless, current bio-data 40 and stored bio-data 42 are analyzed for a match at 44 in computer 14. Note in this regards, that stored bio-data 42 could be stored on token 16 or it could be stored in association with computer 14 and simply retrieved based on the authorization of token 16 granted at 24. Subject to the level of matching possible for the bio-data used in a system implemented according to the invention, if there is no match or an unacceptable level of certainty about a match at 44, then computer 14 generates a signal to actuator 26 to close door 28. In addition to, or in lieu of actuating door 28 closed, computer 14 could also simply notify facility security 46 that an access attempt is being made by a person of unknown identity and that they should intervene to intercept person to positively identify them—either by human intelligence or through identification 18 previously provided to computer 14 and possibly also available to security 46 for example via a mobile computing device.

Reader 34 is shown mounted in perimeter 30 near opening 32 such that it can passively scan approaching persons and tokens. As depicted in FIG. 1, the processing all data scanned by reader 34 takes place in computer 14 however it will be understood by one of skill in the art, that reader 34 may in fact have some or all of the computing power necessary for analysis steps 38, 44 and 50. As well, reader 34 could generate the signal necessary to close door 28 via actuator 26. In some configurations, it might be useful for computer 14 to remain for assignment of tokens, and to be situated in a location remote from reader 34 so that visitors can be issued at 22 temporary tokens/authorizations 24 remote from door 28 and so that identification analysis 18 can be performed in the same unit which issues tokens/authorizations, facilitating the distribution of necessary identification data to security 46.

Security 46 also play another role (not shown) in a complete security system for facility 12. They need to be stationed at or near opening 32 of perimeter 30 or at some other entrance to facility 12 which is designated for use by persons who are not members of population 10. For example, in the context of a school 12 parents will need to periodically enter to meet teachers. To avoid locking door 28, these parents need to obtain temporary security tokens which can be issued by security 46, possible using computer 14 at or near opening 32. In this way, door 28 can remain normally open, and school 12 can remain inviting and not locked down while still permitting necessary persons access with appropriate precautions and without accidentally locking down facility 12.

Because token 16 is designed and does measure bio-data of persons making access attempts 36 of perimeter 30, and also does transmit that bio-data to reader 34, it can also be designed to measure physiological indicators 48 such as elevated temperature, pulse, blood pressure, dilated pupils, and other like indicators known to those of ordinary skill in the art, which might signify that the person making the approach is in mental or physical distress. These bio-data indicators of physiological distress, or others which might be collected for example by a camera analyzing facial expressions of identified members of the known population can also be used according to the invention to trigger actuator 26 to close door 28 even if stored bio-data 42 matches current bio-data 40 of an approaching person. Alternatively, a distress indicator can simply be used to alert security to the identity of a distressed person that is approaching the security perimeter 30 of facility 12 so that they can be met at or before they reach door 28 where they could initiate conduct harmful to workers or students.

It will be apparent to one of ordinary skill in the art that the system described herein with reference to the FIGURES is as an example of how to implement the disclosure and not a required or detailed production specification. A knowledgeable security professional, bio-data professional and/or programmer may elect to implement the disclosure in a different way to achieve the same benefit.

What is claimed is:

1. A passive security system permitting access to a facility, comprising:

a personal device storing bio-data for a person permitted to the facility;

a sensor associated with the personal device for measuring current bio-data from the permitted person;

an actuator for closing a normally-open door providing access to the facility;

a security perimeter outside the normally-open door, said security perimeter including an opening for funneling people toward the normally-open door;

a reader located at said opening of said security perimeter for reading both the stored and current bio-data from said personal device;

a computer in communication with said reader for receiving and comparing the stored and current bio-data;

a lock signal generated by said computer and sent to said actuator for closing said normally-open door if said stored and current bio-data do not match.

2. The passive security system of claim 1 wherein said computer also generates the lock signal for transmission to said actuator if said reader detects a person at said security perimeter without said personal device.

3. The passive security system of claim 1 wherein said sensor also detects a distress factor from a permitted person, the distress factor transmitted to said computer; and wherein said computer also generates the lock signal for transmission to said actuator in response to said distress factor even if the stored and current bio data match.

4. The passive security system of claim 1 wherein said sensor also detects a distress factor from permitted persons, the distress factor transmitted to said computer; and wherein said computer alerts facility security in response to said distress factor even if the stored and current bio-data match.

* * * * *